United States Patent [19]

Yoshimura et al.

[11] Patent Number: 5,003,404
[45] Date of Patent: Mar. 26, 1991

[54] VIDEO CAMERA

[75] Inventors: Katsuji Yoshimura; Yoshihiro Nakatani, both of Kanagawa; Tadayoshi Nakayama, Tokyo, all of Japan

[73] Assignee: Canon Kabushiki Kaisha, Tokyo, Japan

[21] Appl. No.: 328,872

[22] Filed: Mar. 27, 1989

[30] Foreign Application Priority Data

Mar. 30, 1988 [JP] Japan .................................. 63-077335

[51] Int. Cl.⁵ ....................... H04N 5/76; H04N 5/225; H04N 5/265
[52] U.S. Cl. .................................... 358/335; 358/209; 358/182; 358/906
[58] Field of Search .................. 358/22, 183, 909, 906, 358/182, 210, 209; 360/14.1, 14.3

[56] References Cited

U.S. PATENT DOCUMENTS

| | | | |
|---|---|---|---|
| 4,231,066 | 10/1980 | Merchant | 358/225 |
| 4,591,897 | 5/1986 | Edelson | 358/182 |
| 4,602,286 | 7/1986 | Kellar et al. | 358/183 |
| 4,613,906 | 9/1986 | Tanaka et al. | 358/22 |
| 4,714,962 | 12/1987 | Levine | 358/909 |
| 4,763,208 | 8/1988 | Kawamura et al. | 360/14.1 |
| 4,858,012 | 8/1989 | Hino et al. | 358/210 |
| 4,868,660 | 9/1989 | Rufray | 358/191.1 |

FOREIGN PATENT DOCUMENTS

| | | | |
|---|---|---|---|
| 2936234 | 3/1980 | Fed. Rep. of Germany | 358/906 |
| 0012177 | 2/1981 | Japan | 358/182 |

Primary Examiner—John W. Shepperd
Assistant Examiner—James Juo
Attorney, Agent, or Firm—Robin, Blecker, Daley & Driscoll

[57] ABSTRACT

A video camera includes in combination an image sensor, an image memory, a special effect circuit arranged to impart a special effect to the output signal of the image sensor by using the image memory, a selection circuit arranged to select either the output of the image sensor or that of the special effect circuit, and a control circuit which, in response to a pause of an image recording action, causes an image obtained when the pause is made to be stored in the image memory when the output of the special effect circuit is selected by the selection circuit.

12 Claims, 3 Drawing Sheets

VIDEO CAMERA

BACKGROUND OF THE INVENTION

1. Field of the Invention

This invention relates to a video camera and more particularly to a video camera which is capable of giving a video signal obtained through such special effect photography as wipe or cross fade recording.

2. Description of the Related Art

With regard to a video recording/reproducing apparatus called a VTR, there has been known a technique for improving the S/N ratio in normal reproduction and for removing noise bars in special reproduction, etc. through a digital signal processing operation by using an image memory. The image memory is used also in a camera-incorporating type VTR (hereinafter referred to as camcorder) for improvement in sensitivity and for attaining a special effect, such as a so-called wipe effect or a so-called cross fade effect.

In the above-stated special effect attaining operation of the camcorder, any desired image is stored in an image memory and is used for imparting a wipe or cross fade effect merely to a motion picture to be taken. However, the wipe or cross-fade effect imparting action is not intended to interconnect images by inserting a wipe or cross-fade recording part at a change-over point between one photographing scene and another.

SUMMARY OF THE INVENTION

It is a principal object of this invention to provide a video camera which is capable of giving such a special effect imparting action as a wipe or cross-fade recording at a break in a photographing operation between one scene and another.

To attain the above-stated object, a video camera which is arranged according to this invention comprises: image sensing means; an image memory; a special effect circuit for performing a special effect imparting action on an output signal of the image sensing means by using the image memory; selection means for selecting one of an output of the image sensing means and an output of the special effect circuit; and control means for causing, in response to a pause of a shooting or recording action, an image sensed at that point of time to be stored in the image memory when the output of the special effect circuit is selected by the selection means.

As mentioned above, the image which is obtained at the time of the pause of shooting or the use of the output of the image sensing means such as recording or a display on a monitor is stored in the image memory in response to the pause. Then, a special effect imparting action can be accomplished by using the image stored in the image memory. In other words, a special effect imparting part can be interposed in between one scene and another to join them together.

Other objects and features of this invention will become apparent from the following detailed description of an embodiment thereof taken in connection with the accompanying drawings.

DETAILED DESCRIPTION OF THE PREFERRED EMBODIMENT

Figure 1:
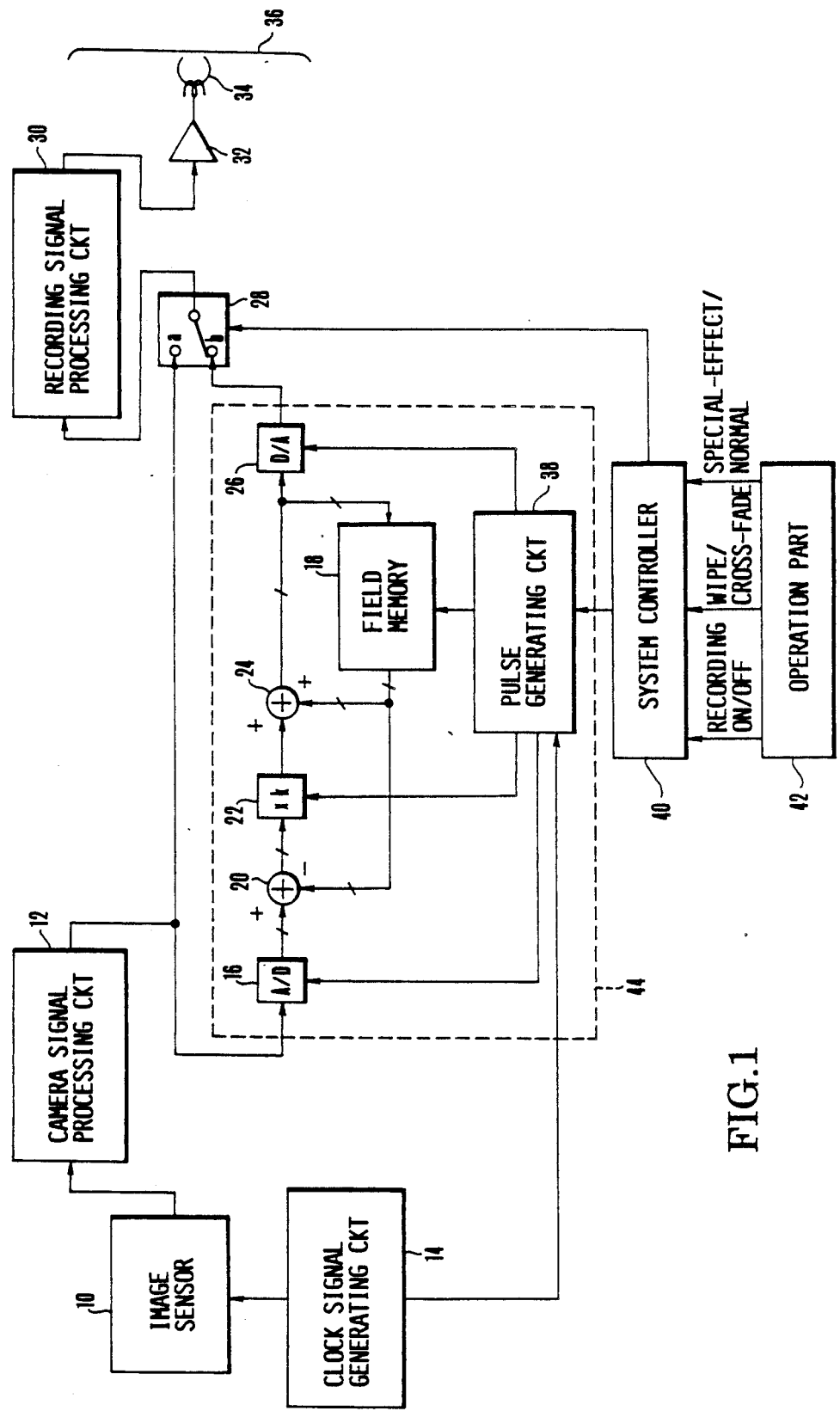
FIG. 1 is a block diagram showing the arrangement of an embodiment of this invention.
Figure 2:
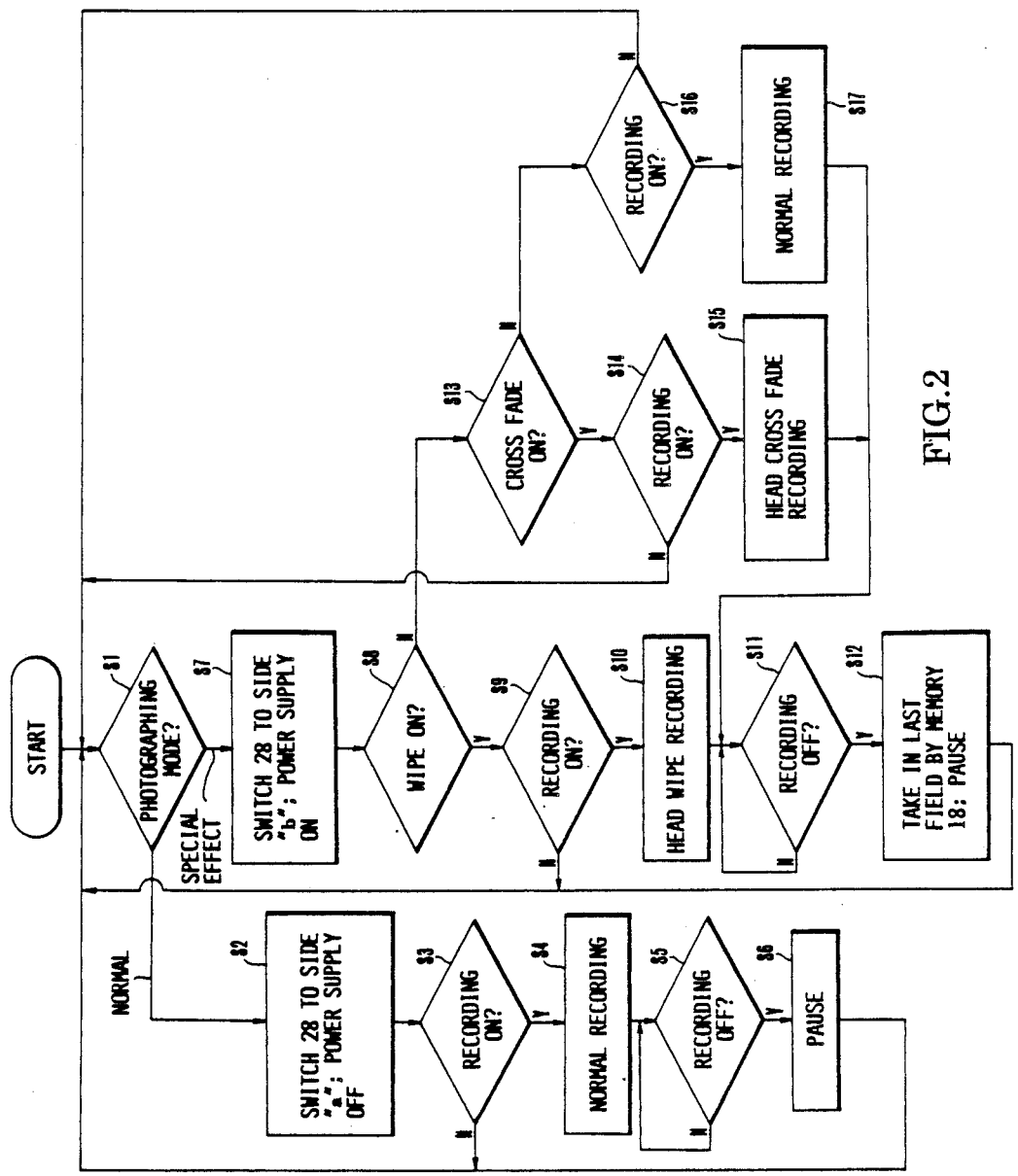
FIG. 2 is a flow chart showing the operation of the embodiment.

An embodiment of this invention is described below with reference to the accompanying drawings, in which: FIG. 1 is a block diagram showing in outline the arrangement of a camera-incorporating type VTR to which the invention is applied as the embodiment thereof. FIG. 2 shows in flow chart the operation of the VTR.

Referring to FIG. 1, a two-dimensional image sensor 10 is a CCD or the like. A camera signal processing circuit 12 consists of an AGC part, a gamma correction part, an NTSC encoder, etc. A clock signal generating circuit 14 is arranged to generate a clock signal for driving the image sensor 10. An A/D converter 16 which is arranged to digitize an analog video signal output from the camera signal processing circuit 12, for example, with a sampling frequency of 4 fsc (fsc: color subcarrier frequency) and with eight quantizing bits. A field memory 18 is arranged to serve as a delay element for delaying an input signal for a period of one field. A subtracter 20 is arranged to subtract the output of the field memory 18 (or a signal for an immediately preceding field) from the output of the A/D converter 16. A coefficient multiplier 22 is arranged to multiply the output of the subtracter 20 by a variable coefficient k. An adder 24 is arranged to add the output of the field memory 18 to the output of the coefficient multiplier 22. A D/A converter 26 is arranged to convert the output of the adder 24 into an analog signal. Further, the output of the adder 24 is supplied also to the field memory 18. A selection switch 28 is arranged to have its connecting position on the side of one contact "a" to select the output of the camera signal processing circuit 12 in a normal photographing mode and on the side of another contact "b" to select the output of the D/A converter 26 in the event of a special effect photographing mode. A recording signal processing circuit 30 is arranged to separate a composite video signal into a luminance signal and a chrominance signal, to frequency-modulate the luminance signal, to low-band convert the chrominance signal and, after that, to output them in a multiplex state. The illustration includes a recording amplifier 32, a recording head 34 and a magnetic tape 36.

A pulse generating circuit 38 is arranged to form, in accordance with a clock signal output from the clock signal generating circuit 14, a timing pulse signal for driving the A/D converter 16, the coefficient multiplier 22, the field memory 18 and the D/A converter 26. A system controller 40 is arranged to control the pulse generating circuit 38 and a selecting operation of the selection switch 28. An operation part 42 is arranged to give instruction signals of varied kinds to the system controller 40, including instructions for selection between the start (on) and the stop (off) of recording, between wipe and cross-fade recording actions and between special effect photography and normal photography.

The A/D converter 16, the field memory 18, the subtracter 20, the coefficient multiplier 22, the adder 24, the D/A converter 26 and the pulse generating circuit 38 jointly form a digital signal processing part 44 for the above-stated special effect photography. They receive power supplies from one and the same power source for a reason which will be described later.

Figure 3:
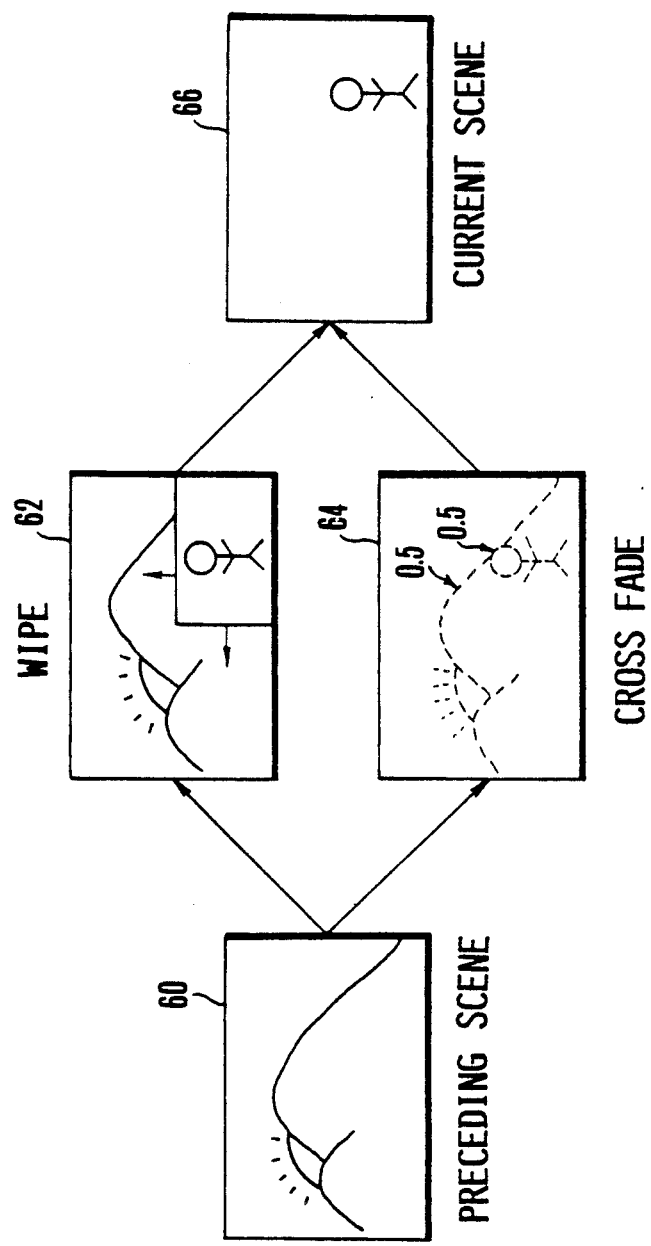
FIG. 3 shows by way of example a change brought about on a picture by a special effect imparting action.

Further, as indicated by pictures 60, 62 and 66 in FIG. 3, the term "wipe" means the art of changing a still image 60 which is the output of the field memory 18 (the last field of the preceding picture) over to a moving image 66 currently being photographed in such a way as to gradually increasing the area occupied by the latter by splitting the picture. The picture 62 represents a transient state obtained during the process of the image change-over. The image change-over can be accomplished by changing the value of a coefficient k which is used by the coefficient multiplier 22 between "0" and "1". The last scene of the preceding picture thus can be smoothly connected with a scene of the picture currently being taken. The term "cross fade" means the art by which the still image (of the last field of the preceding picture) which is the output of the memory 18 and the moving image 66 currently being photographed are superposed on each other and then the rate of weight attached to the current picture 66 is gradually increased. A picture 64 of FIG. 3 represents the transient state obtained during the cross-fade process. The weight shifting process can be accomplished by gradually changing the value of the coefficient k of the coefficient multiplier 22 from "0" to "1".

Next, referring to FIG. 2 which is a flow chart, the VTR shown in FIG. 1 operates as follows: When the normal photographing mode is selected by the operation part 42 at a step S1, the system controller 40 shifts the connecting position of the selection switch 28 to the contact "a" and cuts off a power supply to the digital signal processing part 44 at a step S2. This is because a camcorder (camera-incorporating type VTR) is in most cases arranged to be driven by a battery and thus calls for minimization of electric energy consumption. After that, when the photographer pushes a recording switch at the operation part 42 to instruct for recording an image signal at a step S3, a recording start signal is supplied to the system controller 40. Then, at a step S4, the output of the camera signal processing circuit 12 is supplied via the switch 28 to the recording signal processing circuit 30. A signal output from the circuit 30 is recorded on the magnetic tape 36 in a known manner. When the photographer turns off the above-stated recording switch to instruct for bringing the recording action to a stop at a step S5, the flow of operation comes to a step S6. Step S6: The system controller 40 receives a recording stop signal and the recording action comes to a stop.

In a case where the special effect photographing mode is selected by the operation part 42 at the step S1, the flow of operation comes to a step S7. Step S7: The system controller 40 shifts the position of the switch 28 to the contact "b" thereof and, at the same time, causes the power supply to be effected to the digital signal processing part 44. Upon receipt of the power supply, a video signal obtained at that point of time is stored in the field memory 18. The special effect photographing mode and the normal photographing mode cannot be selected at the same time. The selection of either of them is detectable by the on- or off-state of a special effect photographing mode switch which is not shown but is included in the operation part 42. After completion of the step S7, the flow comes to a step S8. Step S8: The special effect photographing is checked to see if it is for the wipe effect. If so, the flow comes to a step S9. Step S9: The recording switch is checked to see if it is on. If so, the flow comes to a step S10. Step S10: A head wipe recording action is performed. Step S11: This recording action continues till the recording switch turns off. When the recording action comes to a stop with the recording switch turned off, the flow comes to a step S12. Step S12: The video signal of the last field is taken in by the field memory 18. The recording comes to a pause. If the recording switch is found to be off at the step S9, the flow comes back to the step S1.

In a case where the wipe action is found to be not selected (on) at the step S8, the flow comes to a step S13. Step S13: A check is made to see if the cross fade action is selected (on). If so, the flow comes to a step S14 to check the recording switch to see if it is on. If not, the flow comes back to the step S1. If the recording switch is found on, the flow comes to a step S15. Step S15: A head cross fade recording action is executed and the flow comes to the step S11. At the step S11: The cross fade recording is allowed to continue till the recording switch turns off. With the recording switch having turned off, the flow comes to the step S12. At the step S12, the image of the last field is taken in by the memory 18 and the recording comes to a pause. Meanwhile, in a case where the cross fade recording action is found not to have been selected at the step S13, the flow comes to a step S16. Step S16: The recording switch is checked to see if it is on. If it is found off, the flow comes back to the step S1. If it is found on, the flow proceeds to a step S17. Step S17: Normal recording is executed and the flow comes to the step S11. At the step S11, the normal recording is allowed to continue till the recording switch turns off. The flow then comes to the step S12, at which the image of the last field is taken in by the memory 18 and the recording comes to a stop. The normal recording at the step S17 is performed for the following reason: Generally, no still image is stored in the memory 18 immediately after the change-over from the normal photographing mode to the special effect photographing mode. Therefore, the initial scene is recorded in the normal mode. This is executed by shifting the position of the selection switch 28 to the contact "b" and setting the coefficient k of the coefficient multiplier 22 at "1".

While this invention has been described in the foregoing as applied to a camera-incorporating type VTR, the invention is not limited to that. In accordance with this invention, a TV camera can be arranged to perform wipe or cross-fade recording of a different scene by making a pause in shooting a scene and by storing the picture taken at that point of time in a field memory with a still image left on a monitor. This arrangement would enable a single unit of TV camera to function as a plurality of units. In the case of the embodiment described, the digital signal processing part 44 is arranged to perform the signal processing operation for attaining the special effect in the form of a composite video signal. However, that arrangement of course can be changed to have the special effect attaining process carried out in the form of a component video signal instead of the composite video signal. Further, the field memory 18 may be replaced with a frame memory.

As apparent from the foregoing description, in accordance with the invented arrangement, a continuous, unbroken video signal can be obtained by inserting a special effect recording part in between one scene and another.

What is claimed is:
1. A video camera comprising:

(a) image sensing means;
(b) an image memory;
(c) a special effect circuit for imparting a special effect to an output signal of said image sensing means by using said image memory;
(d) selection means for selectively operating said special effect circuit; and
(e) control means for storing an output of said image sensing means in said image memory in response to pausing of an image pickup operation when the special effect circuit is operated.

2. A camera according to claim 1, wherein said special effect includes a wipe effect.

3. A camera according to claim 1, wherein said special effect includes a cross-fade effect.

4. A camera according to claim 1, wherein when said special effect circuit is operated, said control means causes said special effect to be imparted by using an image previously stored by said image memory.

5. A video camera comprising:
(a) image sensing means;
(b) a first memory for storing an output of said image sensing means;
(c) a second memory having a smaller capacity than that of said first memory; and
(d) control means for causing said second memory to store a part of the output of said image sensing means obtained immediately before pausing of storing the output of said image sensing means in said first memory.

6. A camera according to claim 5, wherein said second memory is a field memory or a frame memory.

7. A camera according to claim 5, wherein said first memory includes an analog recording medium.

8. A camera according to claim 5, wherein said control means is arranged to cause said second memory to store one picture of the output of said image sensing means obtained immediately before pausing of storing the output of said image sensing means in said first memory.

9. A camera according to claim 5, further comprising mixing means for mixing the output of said image sensing means stored in said second memory with the output of said image sensing means to be newly stored in said first memory.

10. A camera according to claim 9, wherein said mixing means includes adding means for adding a signal stored in said second memory to a signal output from said image sensing means by attaching weight to said signals.

11. A camera according to claim 10, further comprising weight varying means for varying a quantity of said weight in proportion to the lapse of time.

12. A camera according to claim 9, wherein said mixing means includes means for replacing part of a signal stored in said second memory with a signal output from said image sensing means.

* * * * *